United States Patent
Goodwin et al.

(10) Patent No.: US 8,234,302 B1
(45) Date of Patent: Jul. 31, 2012

(54) CONTROLLING ACCESS TO ELECTRONIC CONTENT

(75) Inventors: Robert L Goodwin, Mercer Island, WA (US); David Zhao, Bothell, WA (US); Adrian Tsang Kwong Chan, Bellevue, WA (US); Chieh Wang, Issaquah, WA (US); Michael V Rykov, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 434 days.

(21) Appl. No.: 11/541,247

(22) Filed: Sep. 29, 2006

(51) Int. Cl.
*G06F 21/00* (2006.01)
*G06F 17/30* (2006.01)

(52) U.S. Cl. ............ 707/783; 726/3; 726/28; 726/29; 726/30; 707/913

(58) Field of Classification Search .............. 707/913, 707/783
See application file for complete search history.

(56) References Cited

U.S. PATENT DOCUMENTS

| | | | |
|---|---|---|---|
| 5,619,708 A | 4/1997 | Ho | |
| 6,047,309 A | 4/2000 | Dan et al. | |
| 6,202,158 B1* | 3/2001 | Urano et al. | 726/22 |
| 6,321,264 B1 | 11/2001 | Fletcher et al. | |
| 6,574,609 B1 | 6/2003 | Downs et al. | |
| 6,704,733 B2 | 3/2004 | Clark et al. | |
| 7,298,851 B1 | 11/2007 | Hendricks et al. | |
| 7,437,438 B2 | 10/2008 | Mogul et al. | |
| 7,506,246 B2 | 3/2009 | Hollander et al. | |
| 2002/0099818 A1 | 7/2002 | Russell et al. | |
| 2003/0229695 A1 | 12/2003 | McBride | |
| 2004/0024688 A1* | 2/2004 | Bi et al. | 705/37 |
| 2004/0030898 A1* | 2/2004 | Tsuria et al. | 713/171 |
| 2004/0103305 A1 | 5/2004 | Ginter | |
| 2005/0102352 A1 | 5/2005 | Zhang et al. | |
| 2006/0037075 A1 | 2/2006 | Frattura et al. | |
| 2006/0068769 A1 | 3/2006 | Adya et al. | |
| 2006/0153089 A1 | 7/2006 | Silverman | |
| 2006/0272031 A1* | 11/2006 | Ache et al. | 726/28 |
| 2007/0026371 A1 | 2/2007 | Wood | |
| 2007/0061447 A1* | 3/2007 | Flores et al. | 709/224 |
| 2007/0156696 A1 | 7/2007 | Lim | |
| 2008/0022003 A1* | 1/2008 | Alve | 709/229 |
| 2008/0052394 A1 | 2/2008 | Bugenhagen et al. | |
| 2008/0104231 A1 | 5/2008 | Dey et al. | |
| 2008/0282091 A1* | 11/2008 | Ashok et al. | 713/183 |
| 2009/0037578 A1 | 2/2009 | Hattori et al. | |

OTHER PUBLICATIONS

Roberts, Who Goes There? Building Smarter Authentication, InfoWorld, Issue 30, Jul. 24, 2006, pp. 26-30 and 32.*

* cited by examiner

*Primary Examiner* — John E Breene
*Assistant Examiner* — Albert Phillips, III
(74) *Attorney, Agent, or Firm* — Knobbe Martens Olson & Bear LLP (57) ABSTRACT

A system and method for controlling access to electronic content stored on a content provider's server is provided. A content provider may control and restrict unauthorized access to electronic content through an identified user account by limiting a number of devices from which requests to access the content through the account have been received. A content provider may also collect usage information of interest by monitoring authorized access to electronic content.

31 Claims, 6 Drawing Sheets

CONTROLLING ACCESS TO ELECTRONIC CONTENT

BACKGROUND

With the expanding use of computer networks, such as the Internet, an increasing amount of commerce is conducted electronically. Online merchants, manufacturers, and others have made virtually every type of product and service available to consumers via computer networks. As more and more users turn to computer networks, such as the World Wide Web (hereinafter the "Web"), for information, content providers are increasingly converting traditional content (e.g., printed materials, such as books, magazines, newspapers, newsletters, manuals, guides, references, articles, reports, documents, and the like) to electronic form.

An example of such electronic-form content is an "e-book," an electronic (or digital) representation of a book. An e-book is commonly generated by a publisher for distribution via the Internet. Examples of the advantages resulting from providing content in an electronic form include reduced space, indefinite offering duration and quantity, adjustable type size and type face, instant distribution, etc.

However, one disadvantage resulting from electronic distribution of information is that it can potentially be stolen, disseminated, or accessed without approval from the author or publisher. The advent of personal computers, combined with the Internet and popular file sharing tools, have made unauthorized sharing of digital files (often referred to as digital piracy) increasingly common.

Specifically, in the instance where a business offers an online fee-based access to an electronic content stored on its server, the concern is that authors, publishers and other parties involved in the distribution of said content may lose control of such distribution. For example, a customer who purchases online access to a particular item of content stored on a server of a content provider could potentially distribute his or her access information (user identification, password, etc.) to any number of people, thus providing them with unauthorized access to that content.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with an aspect of the present invention, a method for controlling access to electronic content stored on a content provider's server is provided. Generally described, the method includes receiving a request to access electronic content stored by the content provider, authenticating the user account from which the request has been received, and determining whether the received unique device identifier (unique device ID), such as a browser ID, associated with the request to access the content has previously been used to access the content. If the device is determined to have been previously used to access the content, the request to access the content is granted and the content provider may begin tracking usage behavior during the access. If the device has not accessed the content previously, it is determined whether allowing access to the content by the device would exceed the predetermined limit. If this is the case, the access to content is denied. Otherwise, the received unique device identifier is added to a list of unique device identifiers identifying which devices have previously access the content through the account.

In an alternative embodiment, tracking of geographic areas from which the electronic content is accessed is provided. The access to content can be limited by a predetermined number of geographic areas, in addition to, or in substitution of, the limit to the number of devices that may be used by a user to access a particular content.

In accordance with another aspect of the present invention, a computer system is provided, wherein the computer system is configured to track and record usage associated with electronic content and process a request to access the content. The processing includes authenticating a user account, identifying a unique device identifier associated with the user account that requested to access the electronic content, and granting or denying the request based on a determination of whether a number of unique device identifiers associated with the content and the user account exceeds a predetermined value within a predetermined time period.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The disclosure herein is directed to a computer-implemented method and system that controls access to electronic content stored at a location remote from the access request. For example, the content may be stored on a server at a content provider and an access request may be received from a user associated with the content provider. Although specific embodiments will now be described with reference to the drawings, these embodiments are intended to illustrate, and not limit, the present invention.

Prior to discussing the details of the invention, it is recognized by those skilled in the art that the following description is presented largely in terms of logic operations that may be performed by conventional computer components. These computer components, which may be grouped in a single location or distributed over a wide area, generally include computer processors, memory storage devices, display devices, input devices, etc. In distributed computer systems, the computer components are accessible to each other via communication links. Additionally, although numerous specific details are set forth in order to provide a thorough understanding of the invention, it will be apparent to one skilled in the art that the invention may be practiced without some or all of these specific details. In other instances, well-known process elements have not been described in detail in order not to unnecessarily obscure the invention.

Figure 1:
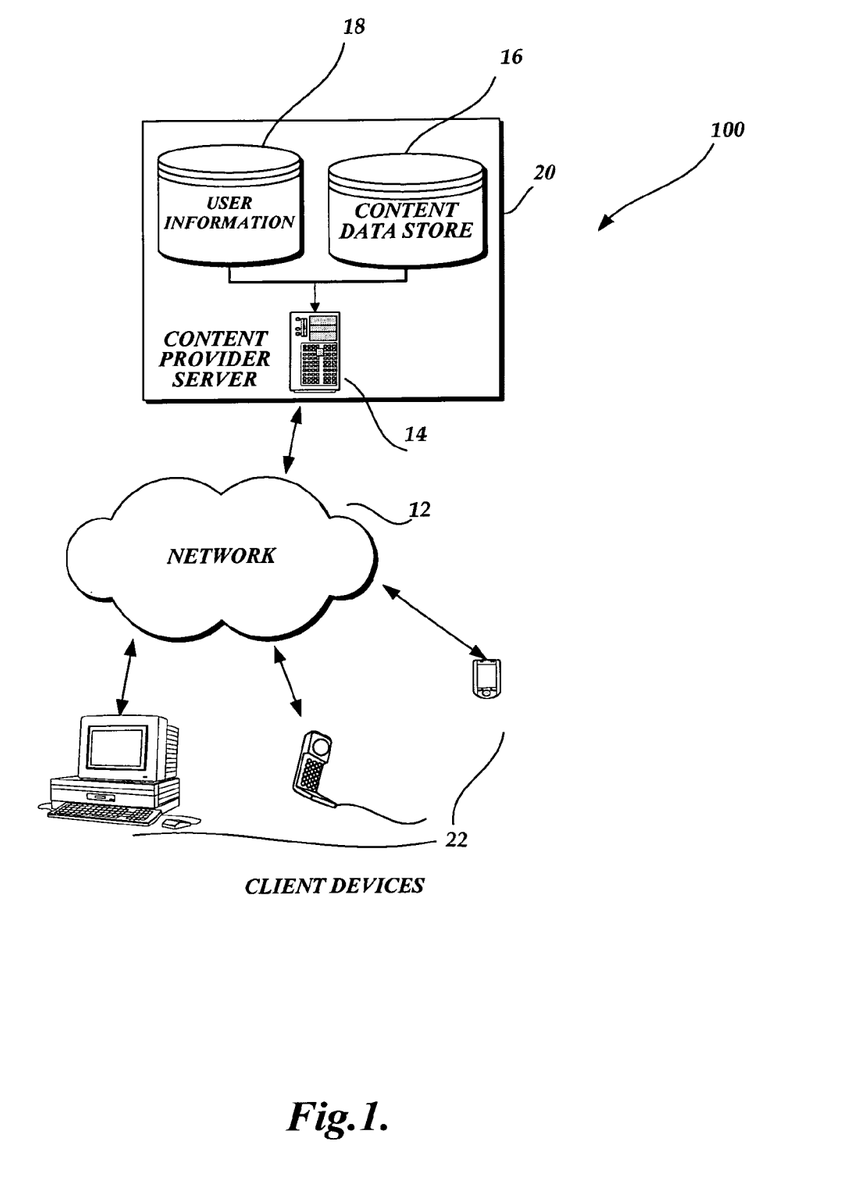
FIG. 1 is a pictorial diagram of one exemplary computing environment in which a method, such as the methods of FIGS. 4 and 5 may be implemented in accordance with one or more embodiments of the present invention.

FIG. 1 illustrates a sample operating environment for controlling access to electronic content stored at a location remote from the access request in accordance with one or more embodiments of the present invention. An access request may be submitted by a user, such as an individual consumer seeking to access one or more items of electronic content. For example, a user may purchase access rights to a copyright-protected material that is maintained by a content provider, such as an e-book, and subsequently request access to that content. The operating environment shown in FIG. 1 includes one or more users (not shown) who can request access via a client device 22 to electronic content stored, for example, in a content provider's content data store 16. A data store, such as the content data store as used herein, is any type, form, and structure of storage in which data is maintained. For example, the data store may maintain data in a database form, such as a relational database, or as images. Any form, type, and structure may be used for maintaining electronic content/information in accordance with one or more embodiments of the present invention. The computer system 20 may be associated with a content provider, such as an online retailer offering to sell access rights to content, i.e., copyright-protected works including music, movies, books, etc.

The client devices 22 and the content provider server(s) 14, depicted in FIG. 1, are configured to electronically communicate with each other via a network 12. The network 12 may be a local area network (LAN) or a larger network, such as a wide area network (WAN) or the Internet, and the communication may occur using wired and/or wireless communication technology. The operating environment shown in FIG. 1 may be configured to communicate any type of electronic content, such as files, Web page documents, commands, and data between the client devices 22, the servers 14 and the data stores 16, 18. As will be appreciated by those skilled in the art, the operating environment shown in FIG. 1 provides a simplified example of one suitable environment for implementing one or more embodiments of the present invention and other operating environments may also be utilized with embodiments of the present invention.

Having obtained access rights, a user account may be created so that the individual user may later access the content. As used herein, a user account is designed to allow an individual or a small set of individuals access to electronic content. Upon obtaining access rights and establishment of a user account, a user, via a client device 22, may contact the content provider to obtain access to selected electronic content. The access request is received by a content provider's computer system 20 that includes, for example, a server computing device 14 and one or more storage units, such as data stores 16 and 18. Using the access request information and information contained in the user information data store 18, the content provider can determine if the client device requesting access should be allowed to access particular content stored in the content data store 16. For example, when access rights are obtained, a user may be provided or specify a user name and password that is associated with the user account. That information may be maintained in the user information data store 18, along with other user information, and used to determine whether access should be allowed.

Before turning to FIG. 2 that illustrates an embodiment of the present invention, the basic principles of a browser identification, which are pertinent to the embodiment of the present invention, will be explained. It will be appreciated by those skilled in the art that a browser identifier ("ID") is a type of unique device identifier due to the fact that it may contain HTTP information, such as a cookie, which may be used to uniquely identify a particular device. As it is known in the art, an HTTP cookie is a piece of text that a Web server can store on a client device and that can be subsequently retrieved. A cookie is sent by a server to a web browser on a device and then sent back unchanged by the device each time it accesses the server that provided the cookie. HTTP cookies may be used for authenticating, tracking, and maintaining specific information about devices.

Consequently, cookies may be used by a server to recognize devices that have been used by the individual user to access a particular user account and/or content accessed via a particular user account. For example, the content provider server 14 (FIG. 1) may receive an access request containing, among other data, a username and password, and check them against the user account data stored on the user information data store 18. If the username and password are correct, the server may send back a page confirming that logging has been successful together with a cookie, while storing the cookie on the client device 22 and on the server itself (or on the client information data store 18). Every time the user requests access to electronic content using the same client device 22, the device 22 automatically sends the cookie back to the server and the server compares the cookie with the stored ones. If a match is found, the server knows which device has requested that page.

Thus, a server can recognize a device and establish a "one-to-one" association between the user account, the client device, the browser that is used to request access, and the requested electronic content. When a subsequent access request to particular electronic content is received from the same client device 22 for the same account, the content provider recognizes the account and that it is the same accessing device and grants access to the content. By confirming that access to content via a specific account through the same device 22, it can be expected that the access is by the same authorized user, thereby controlling access to the content.

If a subsequent access request to the same content using the same user account but a different client device is received, the content provider can determine that the request is from a different device and thereby potentially unauthorized. As discussed below, additional consideration may be made before granting or denying access to electronic content through a new client device. One technique for identifying devices and associating those devices with user accounts is by tracking browser IDs for each device that uses a particular user account. Those skilled in the art will appreciate that a using a browser ID is one way of identifying a particular device, but that any type of device identifier may be used with embodiments of the present invention.

By assigning a threshold to the number of unique device IDs that may be used by a single account to access a particular item of electronic content, a provider can limit any potential unauthorized content. For example, if the threshold value is five, the particular content may be only accessed through that user account via five different devices. If a user distributes access to the content without authorization, only five devices will be able to actually gain access to the content. In some instances, the authorized user may be denied access as a result of access by unauthorized individuals. Thus, in addition to limiting unauthorized distribution, the potential of not being able to access the content is another deterrent to allowing unauthorized access. In sum, the unauthorized distribution of that content can be reduced or potentially eliminated.

Figure 2:
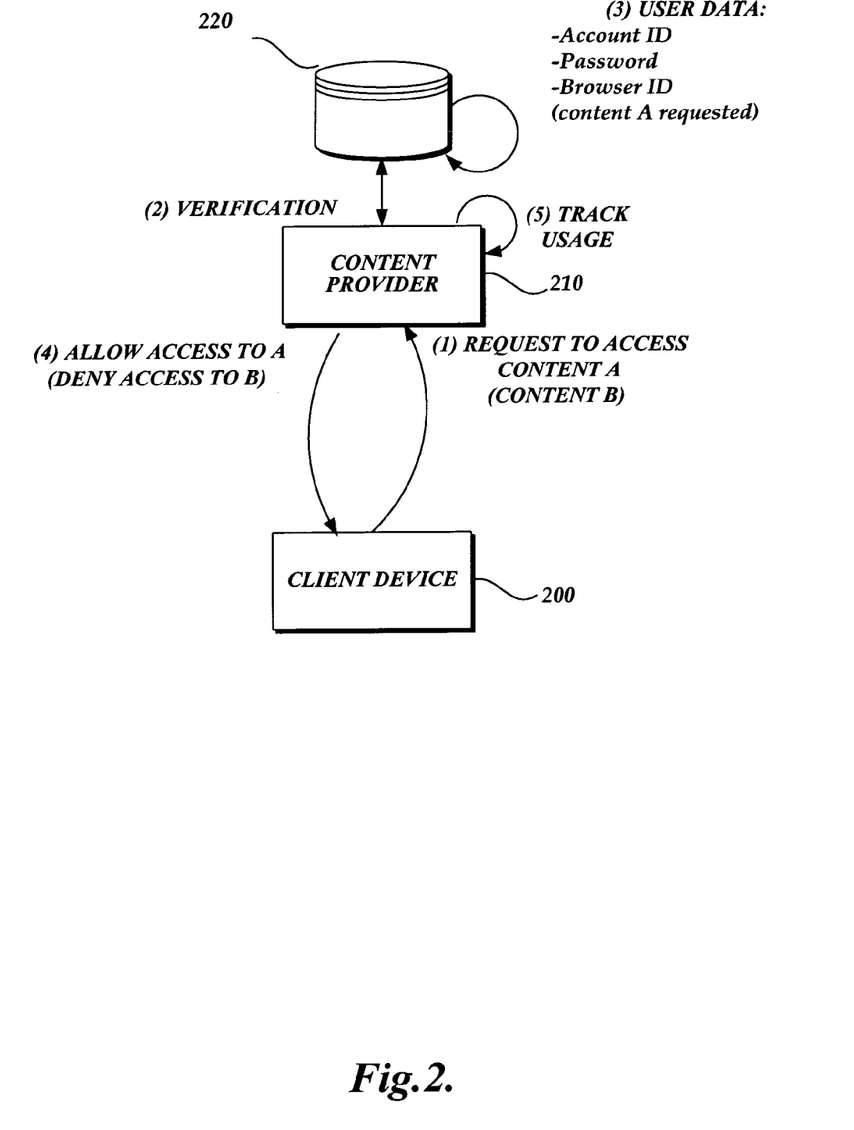
FIG. 2 is a state diagram illustrating the controlled access to electronic content in accordance with one or more embodiments of the present invention.

With reference now to FIG. 2, illustrative interactions between a client device 200 and a content provider server 210 for controlling access to electronic content in accordance with one or more embodiments of the present invention will be described. At an initial point, a user, via a client device 200, may submit a request to access a particular item of electronic content ("content A" in FIG. 2) to a content provider 210. Such request may include information corresponding to the user account, such as the user account ID, password, and a unique device identifier, such as a browser ID.

Then, the content provider 210 may process the received request. In an illustrative embodiment, the processing may include a number of processing rules or instructions that can be executed by the content provider. Such instructions may include verification of the received user data, for example, the user account ID, password, and the unique device ID, by comparing it to the data stored in the user information data store 220. If the user account ID/password matches an account ID/password stored in the user information data store, the server executes the matching of the unique device IDs to the ones, if any, stored in the user information data store and associated with that account ID. If a match is not found, the total number of different devices that have been previously used to access that particular content via that account, including the current one, is determined and compared to a predetermined limit or threshold. If the total number of identified devices associated with the account ID plus the current device, which requested access, does not exceed the predetermined limit, the service provider grants access to the content. However, if the total number exceeds the predetermined limit, access will be denied. If a match is found between the received unique device identifier and the device identifiers currently associated with the account, access will be granted.

Along with the decision to grant access, the server may begin tracking usage of the content during the access. The usage may include, for example, tracking geographic areas from which the content has been accessed (the detailed description of this embodiment is provided below with respect to FIG. 5), the sections of the content accessed, the duration of the access, and other types of usage behavior.

Figure 3A:
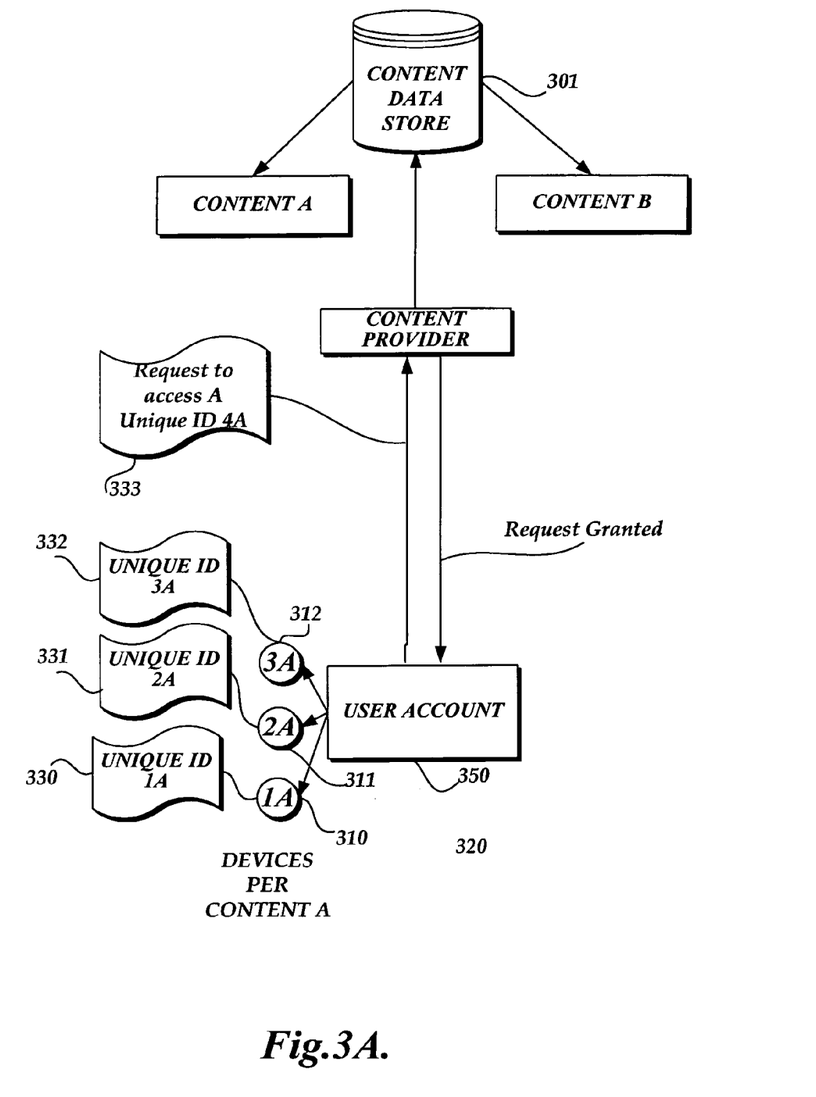
FIGS. 3A and 3B are pictorial diagrams illustrating an exemplary embodiment for controlling access to electronic content, in accordance with one or more embodiments of the present invention.
Figure 3B:
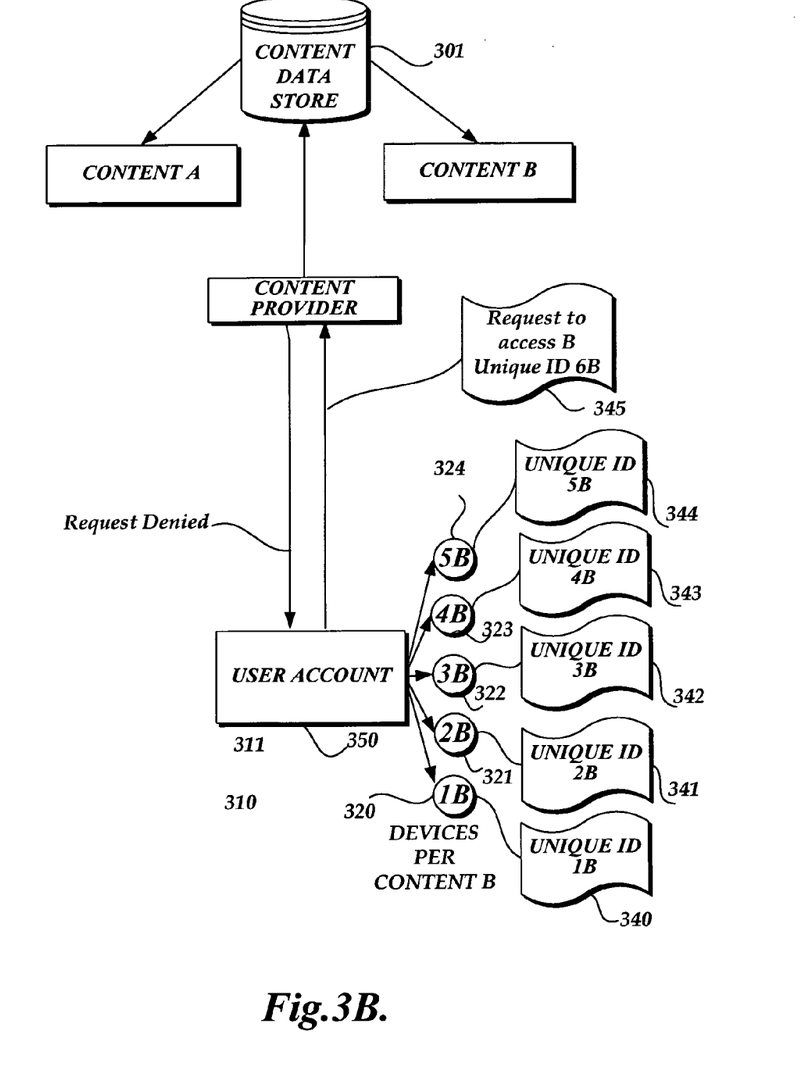

Referring to FIGS. 3A and 3B, the pictorial diagrams illustrate an embodiment wherein multiple requests to access content A and B stored on a data store 301 via a user account 350 are processed in accordance with one or more embodiments of the present invention. For purposes of this example, it is assumed that access via the user account 350 to contents A and B has previously occurred. More specifically, it is assumed that content A has been previously accessed by the user via devices 1A 310, 2A 311, and 3A 312. Content B has been previously accessed via devices 1B 320, 2B 321, 3B 322, 4B 323, and 5B 324. The devices 310-312 and 320-324 each maintain unique device identifiers, such as browser IDs 330-332 and 340-344 as shown in FIG. 3. As discussed above, a predetermined limit or threshold indicating a maximum number of devices that the individual user can use to access content via a specific account is established. In this example, the threshold is set to five. It will be appreciated that a content provider may select and use any limit as the threshold.

The example in FIG. 3A of the user requesting access to content A corresponds to the embodiment illustrated in FIG. 2. If devices 1A 310, 2A 311, and 3A 312 have previously been used by the user to access content via the user account 350 and a request to access content A via the user account 350 is received from a device having a unique device ID 4A 333, the content provider will grant permission to access content A because the total number of devices does not exceed the threshold.

However, referring to FIG. 3B, if a request is received for access to content B from a device having a unique device ID of 6B 344 and it is determined that devices 1B 320, 2B 321, 3B 322, 4B 323, and 5B 324 have already accessed content B through account 350, the service provider will deny access. Access in this example is denied because allowing access to the device submitting the request would result in exceeding the predetermined threshold.

Figure 4:
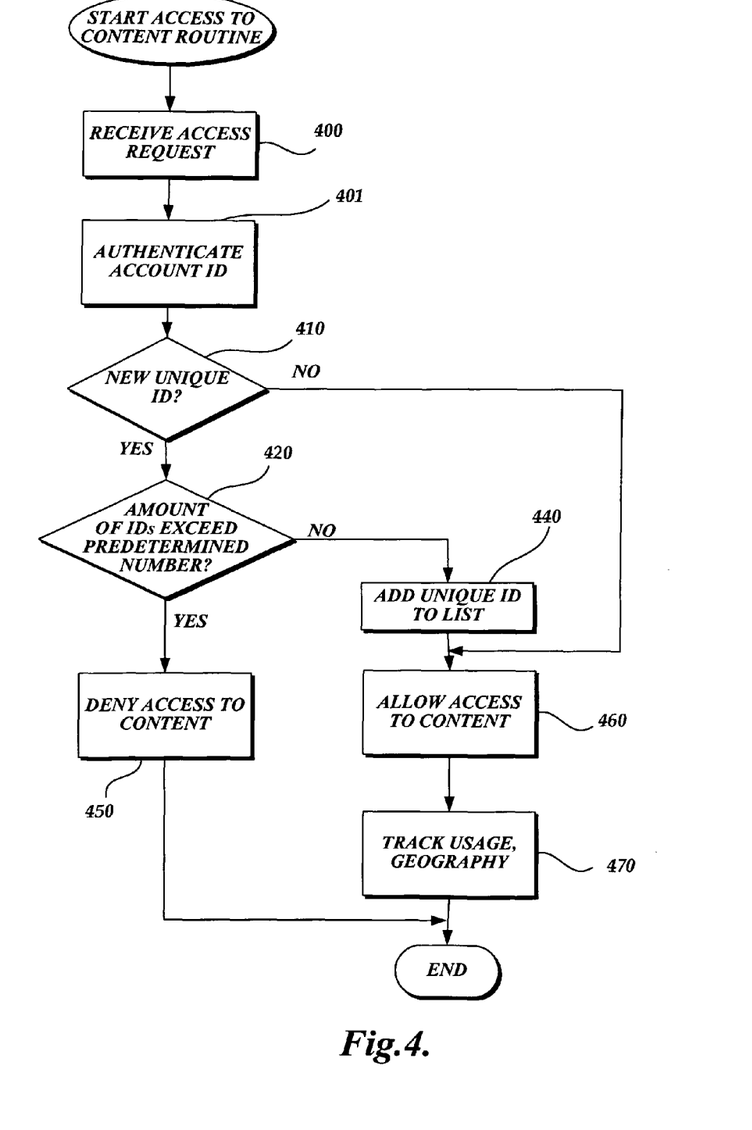
FIG. 4 is a flow diagram of a routine for controlling access to electronic content, in accordance with one or more embodiments of the present invention.

Referring now to the flow diagram of FIG. 4, one embodiment for controlling access to electronic content stored remotely is described. At block 400 a request to access content is received. The request may include, among other information, a user account ID, password, and a unique device ID, such as a browser ID. At block 401 the routine authenticates the user account ID and the information associated with the account ID. For example, it may be determined whether the user account purchased the right to access the content. Once it is established that the user account has a valid account ID and there exists the right to access the requested content associated with that account ID, the routine continues at decision block 410, where it is determined whether the unique device ID received in the access request is new. The unique device ID may be, for example, a browser ID or any other type of identifier that can be associated with a device. Through use of a unique device ID it may be determined whether the device requesting access has previously accessed the content via the user account.

If it is determined that the received unique device ID is already associated with the account, thereby indicating that the same device has been used to access that particular content through the account, the routine continues at block 460, where access to the content is allowed. In addition, at block 470 usage of the content during the access is tracked. Such information may include, but is not limited to, geographic location of the device, sections of the content that are being accessed and other usage behavior that may be of interest.

In one embodiment, the system may track the time and the location of the device accessing a particular content through a particular user account. This information can be used to compare it with similar data collected at a different point in time or location for the same user account accessing the same content. For example, if device 1A 310, having a unique device ID 1A 330 accessed a particular content through user account 350 in the U.S. for a certain period of time, and then a device 2A 311 having a unique device ID 2A 331 accessed the same content through the same user account 350 in Europe within minutes or hours, it can be determined that there are likely two different users, one in the U.S., and another in Europe. As a result, one of those users may be unauthorized and access may be denied, even though the threshold has not been exceeded. Generally, a set of rules and instructions may be developed that, based on the use of the combination time/area of access of a particular content in relation to previous times/areas of access of that content, can lead to a determination regarding validity of access of a particular content.

In another embodiment, the system may track particular parts of content that are accessed, geographic areas from which the content has been accessed and/or the times of access. For example, if the same section of the content (e.g., chapter 1 of a particular book) has been accessed by different devices from the same user account within a particular period of time and, perhaps, from different locations, a determination can be made regarding validity of such accesses based on the presumption that it would be unlikely that the same user would read the same section of the same content within a limited time period from different locations. As in the example above, a set of rules and instructions may be developed such that, based on a combination of time, usage, and location, a determination may be made regarding validity of a particular access to a particular content through a particular account.

In yet another embodiment, geographic areas from which access to a particular content occurred, may be tracked in addition to, or in substitution of, tracking the unique device IDs accessing the particular content. This embodiment is discussed below in greater detail.

Returning to FIG. 4, if at decision block 410 it is determined that the unique device ID contained in the received access request has not yet been associated with the user account, the routine continues at decision block 420, where it is determined whether a total number of devices (as identified by unique device IDs) that have been used to access the content through the user account, including the current requesting device, exceeds the predetermined limit of devices allowed to access the requested content from the user account authenticated in block 401. As it will be appreciated by those skilled in the art, such determination can be made in a number of different ways. For example, a list of unique device IDs per content per user account may be accumulated and maintained by the content provider for a limited period of time or indefinitely. The description that follows illustrates alternative embodiments of this process. However, the process of decision block 420 is not limited to the embodiments presented below.

In one embodiment, the total number of devices per content per user account can be accumulated over a predetermined "static" period of time, for example, one month. For the purposes of this particular example, it is assumed that the month begins January 1. If a request to access a particular content through the account is received from a new device within the time period of January 1 to January 31, the total number of devices that have previously accessed this particular content from the particular user account is determined based on the number of unique device IDs accumulated from January 1 to the moment the new request was received. Then, the determination made in block 420 will amount to comparing the total number of devices counted over the accumulation period, plus the current requesting device, with the predetermined limit of devices allowed to access a particular content from a particular user account.

Similarly, a new accumulation period would start on February 1 and end on February 28, and the total number of devices per content per user account is calculated by adding all devices that accessed a particular content from the user account during the period beginning February 1 to the moment in February the new access request arrived. It is understood that an "accumulation" period can start on any date and last for any predetermined length of time.

In another embodiment, a total number of devices per content per user account can be accumulated over a predetermined "semi-rolling" period of time. This time period may start when the first request to access a particular content from a particular user account arrives and the respective unique device ID is recorded. The accumulation period may last as long as it is desired by the content provider. For example, the content provider may elect to use a 30-day long accumulation time period. Then, if a new request arrives within 30 days from the start of the accumulation period, the total number of devices is calculated for that period from its start to the moment the new request arrived.

By the end of a 30-day period that started when the first unique device ID was recorded, the total number of devices per content per user account accumulated and stored over the course of said period is cleared, thus providing a "clean slate" for the user account accessing a particular content. The new accumulation process starts all over when a new request to access the content arrives and with that event a new "accumulation" period begins.

In yet another embodiment, a total number of devices per content per user account can be calculated over a predetermined "rolling" period of time. The system would accumulate and maintain a list of unique device IDs by account that are used to access a particular content from the account. The total number of unique device IDs per content per user account needed for the determination of decision block 420 may be calculated based on a prior history of access of the content from the user account over a predetermined time-period (e.g., a certain number of days), wherein the end date of said period may be set as the date when the new access request is received. Then, the prior history of recorded unique device IDs per content per account is reviewed going back through the predetermined time period starting at the date the new access request was received, i.e., at the end date of the period. For example, if a new request is received on February 13 and the predetermined accumulation time period is set to be 30 days, the total number of recorded unique device IDs per content per account needed for the determination of decision block 420 should be calculated beginning from the date that precedes February 13 by 30 days, i.e., January 14, and ending on February 13, the date the request was received.

Returning to the flow diagram of FIG. 4, if the process of decision block 420 is completed and it is determined that the number of devices allowed to access the content through the account has been exceeded, the routine will deny access to the content at block 450 and complete.

If the total number of devices that have been used to access the content from the user account, including the current device, stays within the limit of allowed number of devices, the routine continues at block 440, where the currently received unique device ID is added to the list of unique device IDs that have been associated with the requested content from the user account that has been authenticated at block 401. This information may be stored in a data store associated with the content provider, such as a user information data store 18 (FIG. 1). The unique device ID information may be stored in a plurality of data store records, where each data store record identifies a user account and the content access rights for that account. As will be appreciated by one of ordinary skill in the art, existing data store programs may be used for implementing the process of block 440.

The routine then allows access to the content (block 460), tracks usage (block 470) as described above, and completes.

Figure 5:
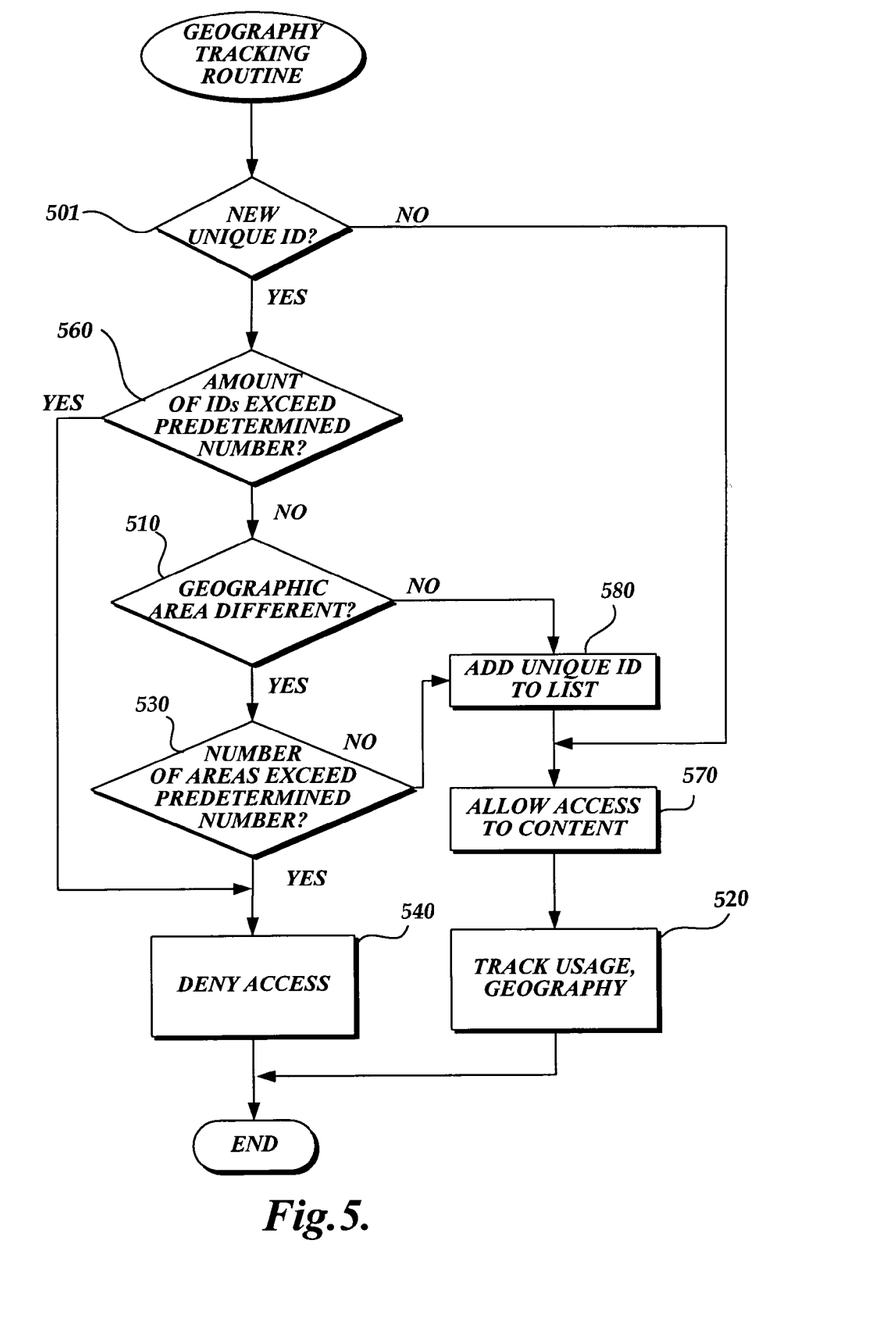
FIG. 5 is a flow diagram of another embodiment of a routine for controlling access to content, in accordance with one or more embodiments of the present invention.

Referring now to FIG. 5, another embodiment for controlling access to electronic content will be described. In the alternative, the routine of FIG. 5 may be used as a subroutine to FIG. 4 and may be executed as a part of the process of block 470 of FIG. 4.

The routine of FIG. 5 illustrates limiting access to electronic content through a particular user account by a number of geographic locations from which such access has been requested. The routine starts with the determination as to whether the unique device ID of the device that requested access to a particular content from a particular user account has previously been associated with that account for that content. The process of decision block 501 of FIG. 5 is similar to that of decision block 410 of FIG. 4. If it is determined that the unique device ID has not been associated, the routine continues at decision block 560, where it is determined whether the number of unique device IDs that have been associated with the account for that content exceeds the predetermined threshold. The process of decision block 560 is similar to that of decision block 420 as described above in regard to FIG. 4. If the threshold has been exceeded, the routine continues at block 540, where access to the content is denied.

If it is determined that the threshold has not been exceeded, the routine continues at decision block 510, where a determination is made as to whether the geographic area from which the access has been received is different than the geographic area of other accesses to the account for that content. If the geographic area is different, at decision block 530 a determination is made as to whether the total number of geographic areas from which access has been requested exceeds the predetermined number of areas. If the total number of allowed geographic areas has been exceeded, access to the content is denied (block 540). If the total number is within the allowed limit or the geographic area remains the same as the one(s) from which previous requests have been made, the unique device ID is associated with the account for the requested content (block 400), access is allowed (block 570), usage is tracked (block 520), and the routine completes.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for controlling access to electronic content, comprising:
   receiving a request to access the electronic content through a user account,
      wherein the request includes account identification and device identification,
      wherein the account identification corresponds to a unique account authorized to access the electronic content, and the device identification corresponds to a device used to access the content, and
      wherein the request is associated with a geographic area identifier and a request time;
   determining whether to provide access to the requested electronic content based on:
      (a) determining if the device identification is associated with the user account providing the request for content;
         if it is determined that the device identification is not associated with the user account, determining if a predetermined number of devices have previously accessed the electronic content through the user account, without determining whether the device has been pre-registered to access the electronic content; and
         denying access to the electronic content if it is determined that a predetermined number of devices have previously accessed the electronic content through the user account; and
      (b) determining if the geographic area identifier associated with the request for the electronic content is different from a geographic area identifier associated with a previous request to access a same portion of the electronic content;
         if it is determined that the geographic area identifiers are different, determining a time difference between the time associated with the request time for the electronic content at the geographic area and the request time associated with the previous request to access the same portion of the electronic content from the previous geographic area; and
         applying a set of rules to determine validity of the request to access the electronic content based on a processing of the total number of geographic areas exceeding a predetermined number of areas and the determined time difference between requests from the different geographic areas;
   wherein the method is implemented by at least one computing device.

2. The computer-implemented method of claim 1, wherein the request to access the electronic content further includes an identification of the electronic content.

3. The computer-implemented method of claim 2, wherein determining whether to provide access to the requested electronic content is further based on determining whether the identification of the electronic content associated with the request time for the electronic content at the geographic area and the identification of the electronic content associated with the previous request from the previous geographic area is the same.

4. The computer-implemented method of claim 2, wherein determining whether to provide access to the requested electronic content is further based on determining whether a section of the electronic content associated with the request time for the electronic content at the geographic area and a section of the electronic content associated with the previous request from the previous geographic area are the same.

5. The computer-implemented method of claim 1, wherein determining if the device identification is associated with the user account includes:
   comparing the received device identification with a list of device identifications currently associated with the user account.

6. The computer-implemented method of claim 1, wherein determining if the device identification is associated with the user account includes:
   determining if the device identification is associated with the electronic content and the user account.

7. The computer-implemented method of claim 6, wherein determining if the device identification is associated with the electronic content and the user account includes:
   comparing the device identification with a list of device identifications associated with the electronic content for the user account.

8. The computer-implemented method of claim 1, wherein the user account may have a plurality of items of electronic content associated therewith; and
   wherein each item of electronic content associated with the user account may have a plurality of device identifications associated therewith identifying which devices have accessed the electronic content through the user account.

9. The computer-implemented method of claim 8, wherein one or more of the items of electronic content associated with the user account may have a same device identification associated therewith.

10. The computer-implemented method of claim 1, wherein the device identification is browser identification.

11. The computer-implemented method of claim 1, wherein the device identification is a unique device identifier of a device that is requesting access to the electronic content through the account.

12. A non-transitory computer-readable medium having instructions stored thereon that direct a computing system to:
   receive an access request for access to electronic content wherein the access request includes a unique device identifier identifying the device from which the access request was received, a user account and an identification of the electronic content and wherein the request is associated with a geographic area identifier and a request time;

determine whether to provide access to the requested electronic content, wherein the determination comprises:
(a) determining if the device from which the access request was received is allowed to access the electronic content, as a function of the number of devices allowed to be associated with the user account, wherein the device need not be pre-registered for access; and
denying access to the electronic content if it is determined that the device is not allowed to access the electronic content; and
(b) determining whether the geographic area identifier associated with the request for the electronic content is different from a geographic area identifier associated with a previous request to access a same portion of the electronic content;
if it is determined that the geographic area identifiers are different, determining a time difference between the request time associated with the request for the electronic content at the geographic area and the request time associated with the previous request to access the same portion of the electronic content from the previous geographic area; and
determining validity of the request to access the electronic content, the validity of the request determined by application of at least one rule set processing a total number of geographic areas from which access has been requested exceeding the predetermined number of areas and the time difference between requests from the different geographic areas.

13. The non-transitory computer-readable medium of claim 12, wherein the instructions that direct the computing system to determine if the device from which the access request was received is allowed to access the electronic content include instructions that direct the computing system to:
determine a number of devices that have previously accessed the electronic content during a predetermined period of time; and
determine if allowing access to the device would result in the number of devices that have accessed the electronic content exceeding a predetermined limit associated with the user account.

14. The non-transitory computer-readable medium of claim 13, wherein the instructions that direct the computing system to deny access to the electronic content include instructions that direct the computing system to:
deny access if it is determined that the number of devices that have accessed the electronic content would exceed the predetermined limit if the device is allowed to access the electronic content.

15. The non-transitory computer-readable medium of claim 14, further including instructions that direct the computing system to:
allow access to the electronic content if it is determined that the number of devices that have accessed the electronic content would not exceed the predetermined limit if the device is allowed to access the electronic content.

16. The non-transitory computer-readable medium of claim 12, wherein the instructions that direct the computing system to determine if the device from which the access request was received is allowed to access the electronic content include instructions that direct the computing system to:

compare the received unique device identifier with a plurality of unique device identifiers associated with the electronic content; and
determine if the received unique device identifier matches any of the plurality of unique device identifiers associated with the electronic content.

17. The non-transitory computer-readable medium of claim 16, further including instructions that direct the computing system to:
allow access to the electronic content if it is determined that the received unique device identifier matches.

18. The non-transitory computer-readable medium of claim 16, further including instructions that direct the computing system to:
associate the received unique device identifier with the electronic content if it is determined that the received unique device identifier does not match.

19. The non-transitory computer-readable medium of claim 12, further including instructions that direct the computing system to:
allow access to the electronic content if it is determined that allowing access would not result in the number of devices that have accessed the electronic content exceeding the predetermined limit.

20. The non-transitory computer-readable medium of claim 19, further including instructions that direct the computing system to:
track usage behavior during the allowed access to the electronic content.

21. The non-transitory computer-readable medium of claim 20, wherein the usage behavior is access to sections of the electronic content.

22. The non-transitory computer-readable medium of claim 20, wherein the usage behavior is a geographic location of the electronic device.

23. The non-transitory computer-readable medium of claim 20, wherein the usage behavior is duration of access to the electronic content.

24. A computer system having a computer-readable medium including a computer-executable program therein for performing a method for controlling access to electronic content, comprising:
receiving at a first geographic location a request from a device at a second location to access electronic content through a user account, wherein the request includes an identification of an account and a unique device identification and wherein the first location is geographically remote from the second location, and wherein the request is associated with a geographic area and a time of request;
determining at the first location if the device is allowed to access the electronic content based on: (1) the received unique device identification and a number of devices with which a user account requesting access to the electronic content can be associated; (2) a maximum number of geographic areas has not been exceeded; and (3) a set of rules applied when a determined difference in time between the request time to access a portion of the electronic content from the geographic area and a previous request time to access the same portion of electronic content from a different geographic area is below a minimum threshold; and
allowing access to the electronic content if it is determined that the device is allowed to access the electronic content, wherein the device need not be pre-registered for access;
wherein the method is performed by a computing system.

25. The computer system of claim 24, wherein determining at a first location includes:
    comparing the received unique device identification with a plurality of unique device identifications identifying devices that have previously accessed the electronic content through the user account; and
    if it is determined that the received unique device identification does not match any of the plurality of unique device identifications, determining if allowing access to the electronic content would result in the number of devices accessing the electronic content through the user account would exceed a predetermined limit.

26. The computer system of claim 25, further comprising:
    if it is determined that allowing access to the electronic content would not result in the number of devices accessing the electronic content through the user account exceeding the predetermined limit, associating the received unique device identification with the electronic content for the user account.

27. The computer system of claim 24, wherein the unique device identification is a browser identifier.

28. The computer system of claim 24, wherein the electronic content is maintained at the first location.

29. The computer system of claim 24, wherein the electronic content is maintained at a third location that is geographically remote from the first location and the second location.

30. The computer system of claim 24, wherein the first location is a service provider that maintains electronic content; and
    the device at the second location is a client device.

31. The computer system of claim 24, wherein the electronic content is an electronic representation of a book.

* * * * *